United States Patent Office 3,426,467
Patented Feb. 11, 1969

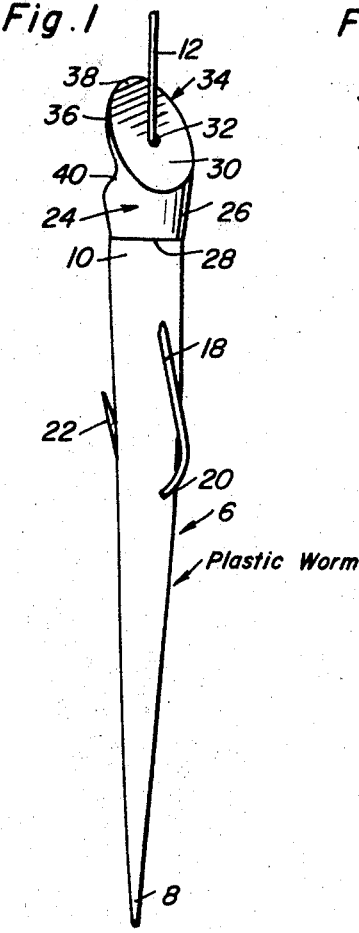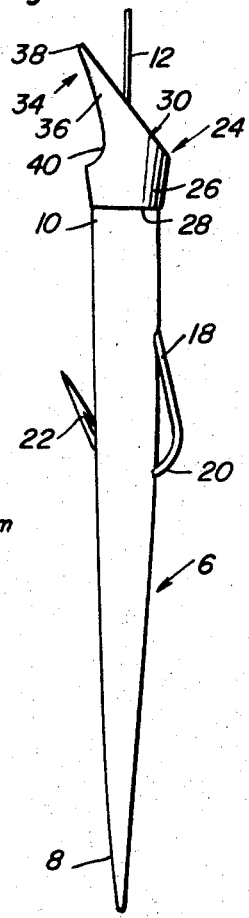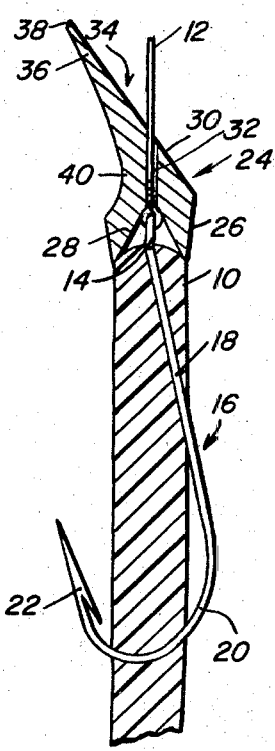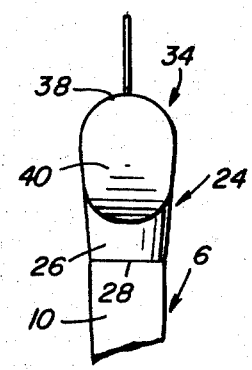

3,426,467
LURE HEAD WITH DIVING VANE
Sherman G. Bryant, Rte. 3, Lewisport, Ky. 42351
Filed Feb. 24, 1967, Ser. No. 618,366
U.S. Cl. 43—42.28        2 Claims
Int. Cl. A01k 85/00

ABSTRACT OF THE DISCLOSURE

A buoyant head is capped over the leading end of a wriggly imitation plastic worm. A spatulate-shape oblique-angled extension on the head provides a duckbill-like diving vane. The head is provided with an axial bore freely receiving a fishing line or leader which is connected to the eye of a fish hook nested in a socket in the rear end of the head. The shank of the fish hook passes through and out of the leading portion of the imitation worm and the point of the fish hook impales the imitation worm.

BACKGROUND OF THE INVENTION

This invention relates to a simple, practical, and economical attachment designed and adapted for use on the forward or leading end of a soft synthetic resin or an equivalent molded plastic fishing worm, more particularly, a unique wooden or an equivalent buoyant head which has an open-ended line passage and is capable of being fittingly capped over said leading end in a manner to enhance the function of the worm and, in so doing, to increase its capability of attracting, enticing and catching more fish.

DESCRIPTION OF THE PRIOR ART

Plastic worms equipped with distinguishably varying line attaching head means are old and well known as shown for example in Smith's revolving worm bait, Patent 3,148,474 and Bodwell's bait holder, Patent 2,622,363. The fishing lure in Norton 2,792,662 shows the idea of embedding two or more line-attached fishhooks in a plastic worm while Clarke, Patent 2,316,048, embeds hooks in the lure (a natural eel) and caps the leading end with a conical weight. In carrying out the principles of the herein disclosed concept, the worm can be and preferably is any plastic worm commonly marketed and not changed. The leader and attached fishhook are conventional. The problem is solved by making available a simple ready-to-attach head (also referred to as a head runner) and wherein said head is of requisite size, is made of buoyant material, wood for example, and features a deflector or vane which achieves the diving, darting and erratic maneuvers which, as practice has shown, enhance the alluring and fish catching results of the thus modified worm. This optional vane-equipped head lends itself to feasible use on any of the worms now on the market and, while it is illustrated in conjunction with a conventional imitation worm and hook-equipped leader or line, the essence of the inventive concept is a head, which is novel in that it is characterized by a duckbill-shaped feather-edged vane or runner on the forward or nose-end of said head.

SUMMARY

Briefly, the improved worm or lure attachment comprises a lightweight wooden head whose base or body portion has an axial open-ended line bore or passage and a recessed cavity providing a pocket in which the leading end of a conventional live-rubber imitation worm is seated. The leader or line is threaded through the bore with the eye of the hook's shank held captive in the cavity. A portion of the worm is impaled on a portion of the shank and the barbed bill portion is embedded whereby to thus attach the hook to the worm (or vice versa) and to hitch the novel head or head runner and worm together in a manner to function as a uniquely animated (1) worm, (2) hook and line and (3) innovated head and vane combination. Novelty is deemed to reside in the over-all combination and, more specifically, in the specially constructed and performing head.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a view in perspective of the improved readily attachable re-usable vane-equipped head wherein the same is shown in its usable position on the leading or forward end of a conventional plastic worm and wherein the leader is connected thereto with the fishhook embedded or impaled in the plastic worm.

FIG. 2 is a view in side elevation of the same.

FIG. 3 is a view on an enlarged scale detailing the construction of the novel head and how the leader is threaded and the component portions of the hook embedded in the plastic worm.

FIG. 4 is a bottom plan view which shows the spatula-like shape and the concaved side of the head.

DESCRIPTION OF THE PREFERRED EMBODIMENT

By way of introduction to the description of the details it is to be pointed out that the term "lure" is used broadly to cover any feasible artificial fishing bait. Inasmuch as the essence of the inventive concept has to do primarily with the unique head, or head runner as it is sometimes called, it will expedite the presentation and understanding of the instant disclosure to construe the lure as the aforementioned plastic imitation worm. In the views of the drawing the worm is denoted generally by the numeral 6 and is characterized, as usual, by an elongate tapering pliant life-like adaptation having a tapering trailing end 8 and a forward end 10. The aforementioned fishing line is characterized primarily by a leader 12 having an end portion suitably connected to the eye 14 of a conventional fish-hook 16. The elongated shank is denoted at 18 and the return-bend is denoted at 20 and terminates in the usual barbed bill or beak 22. It follows that the bait or worm 6 and hook 16 are conventional and that the essence of the invention resides in the readily applicable and removable head 24 which is preferably but not necessarily made of wood or an equivalent economically formable grade of commercial plastics or equivalent lightweight and buoyant material. The head is characterized by a main or body portion 26 having a straight-across end 28 and which in practice is substantially circular in cross-section. The end of the body portion 26 which cooperates with the end 10 of the worm is provided with a recess, more specifically an axially located cavity 28 which is of a size that it serves to accommodatingly receive an abutting or coacting terminal of the end portion 10. The body portion 26 has a planar oblique-angled surface 30 and is further provided with an axial open-ended bore 32 with one end opening into the cavity and the other end opening through the angled or slanted surface 30. This surface 30 merges and is in a common plane with the complemental or companion surface of the offset deflecting vane 34. This cane is tapered as at 36 from right to left in FIG. 3 and is thus appropriately attenuated. The tip or free end portion is of feather-edge dimension as denoted at 38 and this edge is also arcuately rounded as shown in FIG. 4 to provide a forwardly traveling lip, that is, when the over-all lure is drawn by the line through the water being fished. For convenience of description the end 28 can be referred to as the rearward end and the lip or edge 38 as the leading or forward end. The underneath side is arcuately concave as denoted at 40. It follows too that the line or leader passage 32 can be said to open through the oblique-angled surface 30 at the forward end and may be described as communicatively opening into the cavity or recess 28 at the rearward end. The terms "forward," "rearward" and "underneath side" are employed merely for convenience of differentiating the component parts of the head one from the other. It may also be pointed out that the body is purposely and intentionally shaped so that the degree of angle carries the entire body of the nose-like diving vane entirely and completely off-side and away from the center line or axis in both measurement and weight and thus is significantly unbalanced in weight and measurement considering and in respect to the drilled hole or passage 32 at the axial center line (FIG. 3).

It is further pointed out that the head, construed as an over-all attachment, is designed and adapted for optional use with any commonly marketed plastic worm. It is contemplated that these heads or head runners will be made available in sporting goods stores and the like and will probably be packaged in an envelope containing several heads and which in practice are painted varying colors as for example red, black and purple. The extension or vane 34 is disposed at an angular degree that carries it off-center and the intended purpose of the body portion and vane is to achieve, when in use, the desired animated and life-like characteristics broadly referred to as darting, diving, switching from left to right, and animated behavior which has been found to be so successful in attracting and catching fish. It will be evident therefore that the improved head (or head runner) is not limited to rotations but will also cut sharply in the water to the right, left and ascend and descend for reliably effective results.

It will be understood that the herein disclosed ready-to-use head may be painted any color or combination of colors. In fact, it is within the purview of the invention to include, if so desired, artificial painted, imprinted or otherwise applied eyes which may be regarded as properly applicable to diametrically opposite sides of the body part of the over-all head (not shown).

In practice it will be understood that the recessed portion 28 of the aforementioned rearward end of the body part 26 is capped, as it were, over the leading or forwardly traveling end 10 of the worm 6 as illustrated in FIG. 3. The line or leader 12 is threaded freely, as seen in FIG. 3, through the passage 32 and the eye 14 pocketed in the recess or cavity 28. By impaling the shank 18 of the hook diagonally in the worm and then piercing the worm to expose the barbed bill 22 (FIGS. 1–3) the improved combination is ready for use in a seemingly evident manner.

It is also within the purview of the over-all concept to visualize the offset diving vane 34 as a spatulate-type deflector. It is believed however that a component part of a head or the like such as that shown at 34 is aptly designated as a diving vane and that the duckbill shape enables the user to rig the worm or equivalent bait for deep running wobbling and such other maneuvers as will cause the worm to wriggle and more satisfactorily attract a fish.

What is claimed as new is as follows:

1. In combination, an imitation worm made of a pliant buoyant material, said worm having a forward end portion, bodily attachable and detachable head means for said worm and having a surface abutting said forward end portion, said head means also having an axial bore providing a passage and an enlarged counterbore constituting a socket, said socket forming a part of said abutting surface, said passage communicating at a rearward end with said socket, a fishing line passing freely and slidingly through said passage, and a fishhook having a shank portion piercing the forward end portion of the worm, and extending outwardly thereof, said shank portion having an eye, said eye being nested, confined and fulcrumed in said socket and the adjacent end of said line being connected to said eye, the barbed end portion of said hook being impaled through the worm adjacent said head means, the forward end of said worm spanning and covering the rearward open end of said socket, and said hook serving to join the line to said worm.

2. The combination defined in and according to claim 1, and wherein said head means is made of buoyant material and comprises a body portion provided at a forward end with an oblique angled laterally offset diving vane, said vane being duckbill-shaped in appearance and having a substantially planar forward surface.

References Cited

UNITED STATES PATENTS

| | | | |
|---|---|---|---|
| 1,332,306 | 3/1920 | Rush | 43—42.48 |
| 2,102,739 | 12/1937 | Peters | 43—42.24 X |
| 2,187,475 | 1/1940 | Lauby | 43—42.36 |
| 2,617,226 | 11/1952 | Yoshii | 43—42.05 X |
| 2,874,048 | 2/1959 | Walldov. | |
| 3,120,074 | 2/1964 | Messler. | |

SAMUEL KOREN, Primary Examiner.

U.S. Cl. X.R.

43—42.05, 42.36, 42.48, 42.15